US012617133B2

(12) United States Patent
Weber et al.

(10) Patent No.: US 12,617,133 B2
(45) Date of Patent: May 5, 2026

(54) INJECTION MOLD AND METHOD FOR MANUFACTURING INJECTION-MOLDED PARTS

(71) Applicant: WAGO Verwaltungsgesellschaft mbH, Minden (DE)

(72) Inventors: Sebastian Weber, Petershagen (DE); Sebastian Meyer, Minden (DE)

(73) Assignee: Wago Verwaltungsgesellschaft mbH, Minden (DE)

( * ) Notice: Subject to any disclaimer, the term of this patent is extended or adjusted under 35 U.S.C. 154(b) by 176 days.

(21) Appl. No.: 18/516,939

(22) Filed: Nov. 21, 2023

(65) Prior Publication Data

US 2024/0165862 A1 May 23, 2024

(30) Foreign Application Priority Data

Nov. 23, 2022 (DE) ..................... 10 2022 131 019.1

(51) Int. Cl.
B29C 45/03 (2006.01)
B29C 45/18 (2006.01)
B29C 45/26 (2006.01)

(52) U.S. Cl.
CPC .............. B29C 45/03 (2013.01); B29C 45/18 (2013.01); *B29C 45/2602* (2013.01)

(58) Field of Classification Search
CPC ..... B29C 45/03; B29C 45/18; B29C 45/2602; B29C 45/2703; B29C 45/2725; B29C 45/2669; B29C 45/2673; B29C 2045/2683; B29C 2045/2687; B29C 2045/2733
See application file for complete search history.

(56) References Cited

U.S. PATENT DOCUMENTS

| | | | |
|---|---|---|---|
| 3,924,989 | A | 12/1975 | Althausen et al. |
| 6,019,935 | A | 2/2000 | Eckardt et al. |
| 6,503,438 | B2 | 1/2003 | Beaumont et al. |
| 9,586,354 | B2 | 3/2017 | Sundermann |
| 2002/0149135 | A1 | 10/2002 | Choi et al. |
| 2007/0077328 | A1 | 4/2007 | Olaru et al. |

FOREIGN PATENT DOCUMENTS

| | | | |
|---|---|---|---|
| DE | 2252201 | A1 | 5/1974 |
| DE | 102011056694 | A1 | 6/2013 |
| EP | 0666791 | B2 | 9/2000 |
| EP | 2464501 | B1 | 7/2013 |
| JP | S5941239 | A | 3/1984 |
| JP | H08323817 | A | 12/1996 |
| JP | 3092348 | B2 | 9/2000 |
| JP | 2001341166 | A | 12/2001 |
| JP | 2002192561 | A | 7/2002 |
| KR | 20200015125 | A | 2/2020 |
| WO | WO0200414 | A1 | 1/2002 |

*Primary Examiner* — Yunju Kim

(74) *Attorney, Agent, or Firm* — Muncy, Geissler, Olds & Lowe, P.C.

(57) ABSTRACT

An injection mold for manufacturing injection-molded parts by injecting injection molding material into a cavity having a contour corresponding to the injection-molded part to be manufactured. The injection mold includes a distribution channel for injection molding material which is connectable to an injection nozzle and is in communicative connection with the cavity. The distribution channel includes a compensating volume region having a volume, determined by the type and number of cavities connected to the distribution channel, for accommodating injection molding material during the injection molding process.

14 Claims, 7 Drawing Sheets

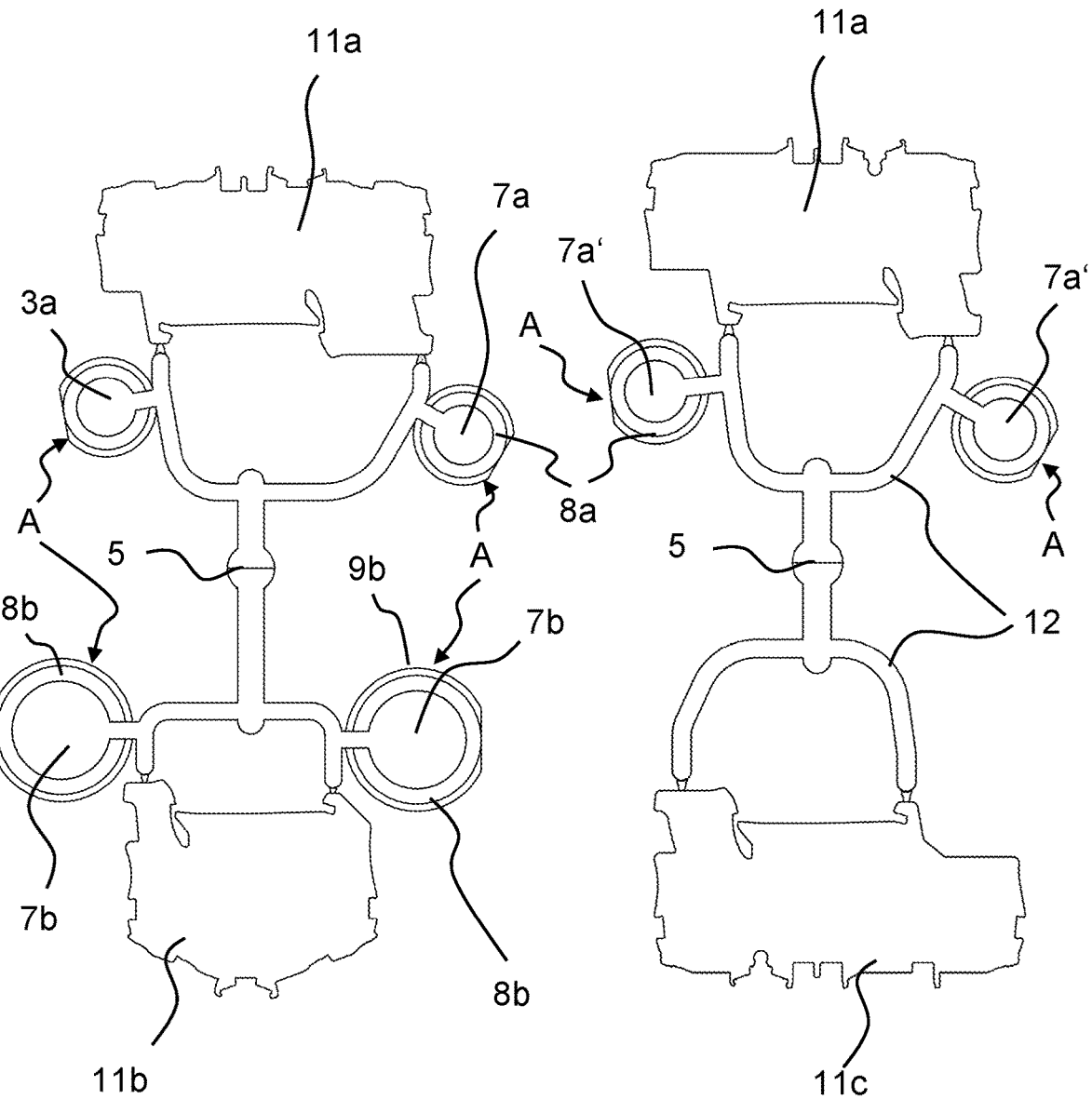
Fig. 7A                  Fig. 7B

INJECTION MOLD AND METHOD FOR MANUFACTURING INJECTION-MOLDED PARTS

This nonprovisional application claims priority under 35 U.S.C. § 119(a) to German Patent Application No. 10 2022 131 019.1, which was filed in Germany on Nov. 23, 2022, and which is herein incorporated by reference.

BACKGROUND OF THE INVENTION

Field of the Invention

The present invention relates to an injection mold for manufacturing injection-molded parts by injecting injection molding material into a cavity having a contour corresponding to the injection-molded part to be manufactured, the injection mold having at least one distribution channel, for injection molding material, which is in communicative connection with the cavity.

The invention further relates to a method for manufacturing injection-molded parts using such an injection mold.

Description of the Background Art

For the economical mass production of molded parts, in particular plastic molded parts, using injection molding, injection molding machines are used which have an injection unit, designed to prepare raw material and inject the injection molding material under pressure into an injection mold, and a closing unit that receives the injection mold and is provided for opening and closing. The injection unit generally has a worm shaft which is rotatably guided in a cylinder, and which in the rear area has a granule inlet, and at the front, free end has a machine nozzle. The injection molding material that is melted in the worm is injected under pressure through the machine nozzle and into the injection mold. The closing unit has a nozzle-side fixed platen that is situated vertically on a machine frame and that bears a nozzle-side mold half. In addition, the closing unit has an oppositely situated fixed platen that is movable, generally hydraulically, in the direction of the stationary fixed platen, and that bears an ejection-side mold half of the injection mold.

By use of such an injection mold half, two mold halves are moved toward one another so that their surfaces are very close together. At least one cavity having a shape that is adapted to the injection-molded part to be manufactured is then present in the overlaid surfaces. At the ejection-side mold, an ejection mechanism is then present which includes at least one plunger for pushing the manufactured injection-molded part out of the cavity. However, the ejection mechanism may have even further parts, for example for creating undercut contours.

The nozzle-side mold half may have, for example, a connection to a heating channel manifold having the associated heating channel nozzle.

DE 10 2011 056 694 B4, which corresponds to US 2014/0175690, which is incorporated herein by reference, and which discloses an injection mold in which mold insert halves of at least one mold insert are fitted into slide-in frames, and the slide-in frames are connectable to one another to form a slide-in module that is removable from the frame tool. A nozzle-side slide-in frame has at least one nozzle opening for receiving at least one associated injection molding nozzle of the injection molding material distribution unit, which is situated at the first nozzle-side mold half.

In this way, the nozzle-side and ejection-side mold halves together with the mold inserts fitted therein may be removed as a whole from the injection molding machine as a customized mold block when retrofitting the fixed platens.

EP 2 464 501 B1 discloses an injection mold having inlet channels for the inflow of injection molding material. Provided in the inlet channel are compensation chambers which ensure a uniform distribution of the injection molding material over a rubber sole of a shoe. Possible differences in the volume of the rubber profile are automatically compensated for, and/or the quantity of the injected material is automatically metered.

EP 0 666 791 B2, which corresponds to U.S. Pat. No. 6,019,935, describes a method for injection molding of molded parts made of thermoplastic material and whose walls enclose a hollow space, wherein the molten plastic is injected in a predetermined amount into the cavity of a mold, during and/or upon which a fluid pressure medium, in particular gas, is applied so that with the formation of the hollow space, the molten plastic is distributed along, and set against, the walls of the cavity. For the targeted control of the wall thickness distribution and to ensure that in each case only the volume of thermoplastic material that is needed to manufacture the molded part in question is injected into the cavity or the mold nest of the mold, the pressure medium is fed into the cavity and into the molten plastic, at first essentially only in the flow direction of the molten plastic. For this purpose, hollow needles for feeding in the pressure media are stationarily installed in the mold, or with their free ends continuously protrude into the mold nest or the cavity, or are temporarily displaceable up to the mold nest or the cavity. The hollow needles are inserted at various locations in the cavity. Excess material may be discharged from the cavity into a channel via a thin area and subsequently separated from the molded part as a "lost spigot."

SUMMARY OF THE INVENTION

It is therefore an object of the present invention to provide an improved injection mold, and a method for manufacturing injection-molded parts using such an injection mold.

In an example, it is proposed that the distribution channel includes a compensating volume region having a volume, determined by the type and number of cavities connected to the distribution channel, for accommodating injection molding material during the injection molding process. The distribution channel which is connectable to an injection nozzle may have multiple sections having an associated cavity. The sections may be present in different mold inserts, and in the installed state form a shared distribution channel that is supplied with injection molding material via the shared injection nozzle.

During injection of the injection molding material, balancing thus occurs in such a way that the compensating volume is determined not only by the type of cavities, but also by the number of cavities connected to the distribution channel.

In particular, when an injection mold is put together using different combinations of cavities that are connected to a shared distribution channel having injection molding nozzles, the compensating volume, or possibly also two or more compensation volumes, may be adapted to the particular combination of the type and number of cavities in such a way that differences in the shot weights and the surface area are compensated for.

When cavities with different shot weights and article dimensions are simultaneously filled via a shared distribution channel or a shared injection site, the at least one compensating volume ensures balancing of the injection mold. A difference in the shot weights and the surface area of the cavities may be compensated for by means of the at least one compensating volume.

Thus, for an injection mold that includes at least two separate mold inserts, each having a cavity for the injection-molded part to be manufactured (i.e., for the article to be produced), at least for one of the mold inserts a compensating volume (second cavity) may be situated at the distribution channel leading to the cavity in the mold insert. This at least one compensating volume is then dimensioned in such a way that the sum of the volume of the cavity and the associated compensating volume for an injection-molded part is equal for each mold insert that is connected to the same distribution channel.

The mold inserts may be integrally designed in an injection mold. However, an injection mold for which different mold inserts for different or identical injection-molded parts may be selectively accommodated is advantageous.

By means of the compensation volumes, the shot weight for each mold insert, i.e., for each injection-molded part to be manufactured, is balanced for mold inserts that are supplied via a shared distribution channel.

The compensating volume region may have a receiving opening. In addition, the injection mold may have a compensation insert that is selectively insertable into the receiving opening. The compensation insert may have an indentation, which communicates with the distribution channel, for providing a compensating volume. In this way, different compensation inserts having different volumes may be selectively inserted into the receiving opening.

Such an injection mold having at least one receiving opening in communicative connection with the distribution channel has the advantage that due to the selective fitting with a selected compensation insert, the particular required compensating volume may be adapted to the shot weight of the other cavities (mold inserts, for example) that are connected to the same distribution channel, in order to provide approximately the same shot weight for each mold insert.

The compensation inserts may have an end-face side with an indentation which provides the compensating volume. A radially outwardly leading groove may merge into the indentation. The distribution channel is communicatively connectable to the indentation via the groove when the compensation insert is inserted into the receiving opening of the injection mold.

The compensating volume, as a branch from the associated distribution channel, is thus connected to the distribution channel via the groove.

The compensation inserts may be cylindrical, for example. It is conceivable for additional asymmetrical contours to be present which ensure a predetermined position of the compensation insert in relation to the associated distribution channel. For this purpose, flat areas, depressions, or protrusions (tabs) may be present at the compensation insert.

The injection mold may include a set of compensation inserts which at their end-face side have indentations having different diameters.

An injection mold set is thus provided which on the one hand has, for example, various mold inserts that are insertable into a slide-in frame, each mold insert having at least one cavity for manufacturing an injection-molded part and having at least one distribution channel leading into the cavity and receiving openings at the distribution channel, and on the other hand having a set of different compensation inserts for different compensation volumes.

When an injection mold is put together with multiple molds for manufacturing identical or different injection-molded parts, it is then possible to select the compensation inserts having the required compensation volumes, and to insert them into the compensation openings of the mold inserts in such a way that for each mold insert, the volumes, made up of the cavity and the compensating volume, connected to the shared distribution channel are as equal as possible for the combination.

A set of compensation inserts which have at least two different outer diameters may be present for the injection mold. The injection mold has receiving openings, determined by the cavities, having a diameter that provides a compensating volume that is adapted to the cavities, and that is suitably selected by incorporating a diameter corresponding to the receiving opening and to the compensating volume.

By use of different diameters for the receiving openings and compensation inserts, small and large compensating volumes may be handled separately from one another. Different gradations of compensation volumes may thus be provided, depending, for example, on the diameter of the compensation insert and the associated compensation opening. However, for a compensation insert having a fairly large diameter, a compensating volume that is small in comparison to a compensation insert having a smaller diameter may also be provided.

Two or more cavities may be connected to a distribution channel, the distribution channel being in communicative connection with at least one compensating volume. The position of one of the compensating volumes with respect to one of the cavities, and the volume provided with the compensating volume, may be determined by the combination of the cavities.

The compensating volume region for a cavity may be connected, as a branch, for example, to the distribution channel in the area of the transition of the distribution channel into the associated cavity. As a result, the compensating volume is situated in the physical proximity of the associated cavity. For example, continuous filling of the cavity and of the compensating volume may be ensured in this way.

For at least one cavity connected in each case to the distribution channel, a compensating volume may be connected to the distribution channel in each case, adjacent to a transition of the distribution channel into a cavity. It is thus conceivable for there also to be cavities that have no compensating volume. This is generally the cavity having the largest volume, which determines the shot weight for all other cavities connected to the distribution channel or to the shared injection molding nozzle.

The injection mold may have an injection molding material distribution unit with a nozzle-side mounting frame and an ejection-side mounting frame. The nozzle-side mounting frame and/or the ejection-side mounting frame may be designed for accommodating mold inserts, each having at least one cavity.

The distribution channels with the compensating volume regions may be introduced into the mold inserts or into the nozzle-side mounting frame and/or the ejection-side mounting frame.

It is advantageous when, for this purpose, receiving openings are connected to the distribution channels in the mold inserts, and appropriately selected compensation inserts with corresponding compensation volumes are inserted into each receiving opening for balancing the shot weight. For a combination of different mold inserts, the volume connected to the distribution channel may be balanced for accommodating injection molding material in such a way that each mold insert connected to the same injection molding nozzle has approximately the same capacity volume.

However, the compensation may also be present due to compensation volumes in distribution channels of the mounting frame, which then each lead to a mold insert. This depends on the structural design of the injection mold and of the mounting frame.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 7A and 7B show a top view of the first and second group of injection-molded parts with compensation inserts.

DETAILED DESCRIPTION

Figure 1:
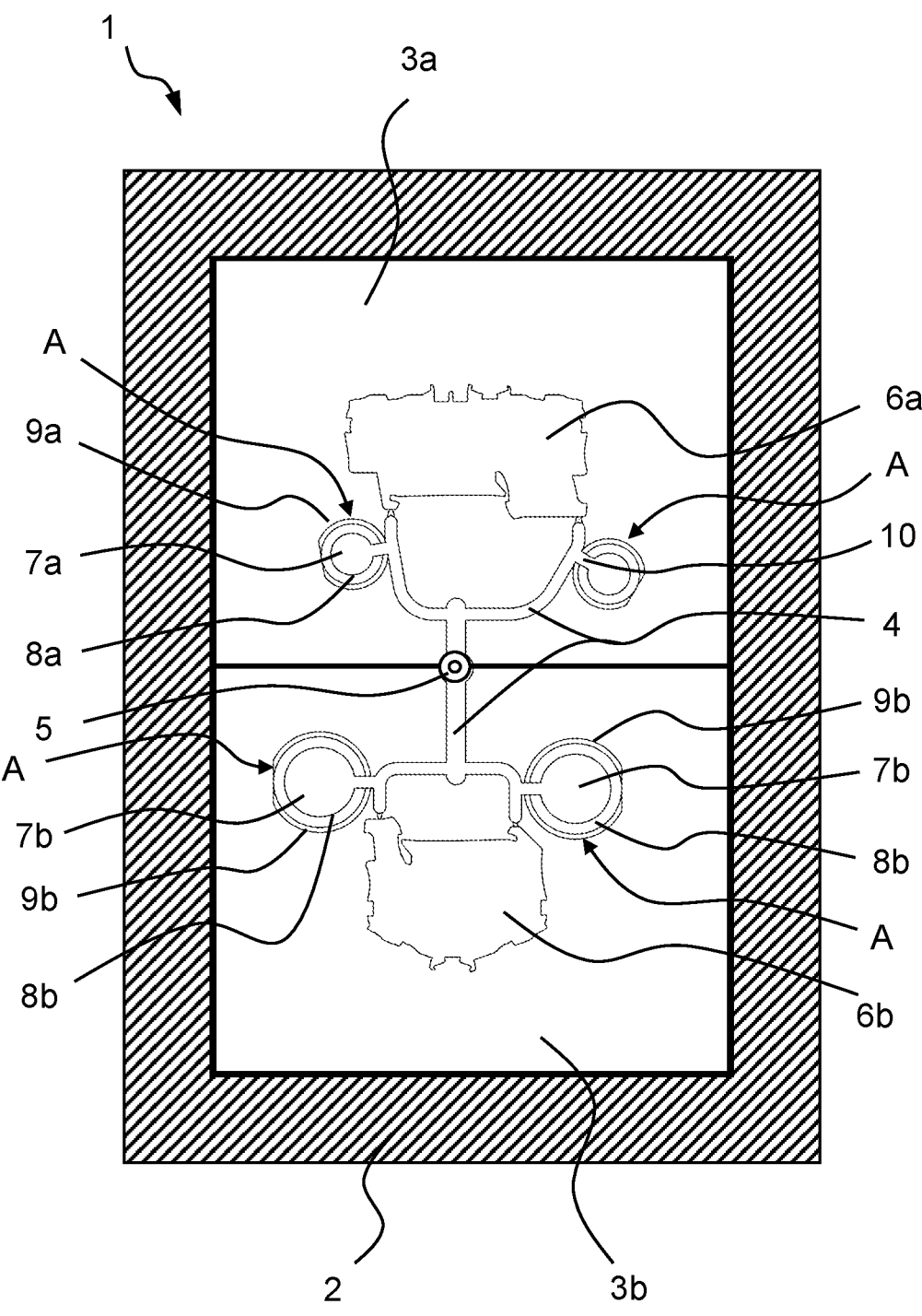
FIG. 1 shows a diagram of a top view of a mold half of an injection mold.

FIG. 1 shows a perspective view of an injection mold 1 that includes a mounting frame 2 for accommodating a group of mold inserts 3a, 3b. In principle, the number of mold inserts 3a, 3b in a group is not limited to the two mold inserts 3a, 3b illustrated. Rather, any given number of at least two mold inserts 3a, 3b may form a group.

The injection mold 1 has a distribution channel 4 which, with multiple sections in the illustrated example, is introduced into the separate mold inserts 3a, 3b. The sections of the distribution channel 4 are connected to a shared injection point 5 for an injection molding material injection nozzle.

The sections forming a shared distribution channel 4 in each case open into at least one cavity 6a, 6b. The cavities 6a, 6b each have a contour and shape in three dimensions which determine the shape of the particular injection-molded part to be manufactured using a cavity 6a, 6b. An injection-molded part is manufactured by injecting injection molding material through the shared injection molding material injection nozzle and the sections of the shared distribution channel 4 branching to the group of cavities 6a, 6b and into the cavities 6a, 6b of the group, which are connected to the branches of the distribution channel 4.

If the injection volumes for the particular branches from the injection nozzle of the shared injection site 5 into the illustrated various branches of the shared distribution channel 4 are different, uniform filling of the cavities 6a, 6b is no longer reliably ensured. This applies in particular for the case when different injection-molded parts having different volumes are simultaneously supplied via a shared distribution channel 4. It is thus apparent that the upper cavity 6a has a larger surface area, and thus a larger volume, than the lower cavity 6b.

In order to now balance the injection molding volumes introduced into the various branches of the distribution channel 4, starting from the shared injection point, for each branch of the shared distribution channel 4 going out from the shared injection point 5 the same shot weight, i.e., the same capacity volume of injection molding material, is set by means of compensation volumes 7 that are in communicative connection with the distribution channel 4.

In order to balance the smaller volume of the lower cavity 6b with the larger volume of the upper cavity 6a, the compensation volumes 7b for this lower mold insert 3b are noticeably larger than the compensation volumes 7a for the upper mold insert 3a.

In the illustrated example, a balancing weight 7a or 7b is present at each of the two branches of the distribution channel 4 in the respective mold insert 3a, 3b, in each case adjacent to the opening into the associated cavity 6a, 6b. This ensures symmetrical filling of the particular cavity 6a, 6b with inclusion of excess injection molding material near the particular opening site into the cavity 6a, 6b.

Depending on the size and routing of the individual branches of the shared distribution channel 4 into the associated cavity 6a, 6b, the size of the compensation volumes for a shared cavity 6a, 6b may also be different in order to balance out a different filling behavior at multiple opening sites into a shared cavity 6a, 6b, by means of the compensation volumes 7a, 7b. The intent is thus to achieve approximately the same filling behavior for all opening sites of a cavity 6a, 6b.

The compensation volumes 7a, 7b as well as the cavities 6a, 6b may be introduced directly into the particular mold 3a, 3b as a compensation cavity. This is meaningful as a simple variant when the make-up of the group of cavities 6a, 6b or optionally a group of different molds 3a, 3b for the different cavities 6a, 6b is known and remains unchanged.

However, if during operation, different groups of molds 3a, 3b having different types and numbers are combined, each of which is supplied via a shared injection point 5 and which thus forms a shared cooperating channel 4, adapting the size of the compensation volumes 7a, 7b is beneficial. Therefore, the molds 3a, 3b in the illustrated example have receiving openings 9a, 9b that are provided for receiving compensation inserts 8a, 8b.

The receiving openings 9a, 9b may have the same shape, for example the same diameter, so that a type of compensation insert 8a, 8b having the uniform shape and the uniform diameter may then be inserted into the mold inserts 3a, 3b.

In the illustrated example, another option is shown in which (two, for example) different receiving openings 9a, 9b having different shapes are provided. In the illustrated example, the receiving openings 9a, 9b are cylindrical. They differ from one another via different diameters. Thus, for example, two types of receiving openings 9a, 9b and correspondingly, two different types of compensation inserts 8*a*, 8*b*, which differ from one another via two different diameters may be present in a set. However, it is similarly possible to also provide three, four, or more different types of compensation inserts, if necessary.

A compensation cavity in the form of a hollow space, whose volume determines the compensating volume 7*a*, 7*b*, is then introduced at the end-face side of the compensation inserts 8*a*, 8*b*.

This compensating volume 7*a*, 7*b* is then communicatively connected to the adjoining section of the distribution channel 4 by appropriate alignment via a groove 10. As an alternative to the groove 10, the compensation inserts 8*a*, 8*b* may also have an opening that is closed all around, via which the compensation volumes 7*a*, 7*b* communicate with the adjoining section of the distribution channel 4.

Figure 2:
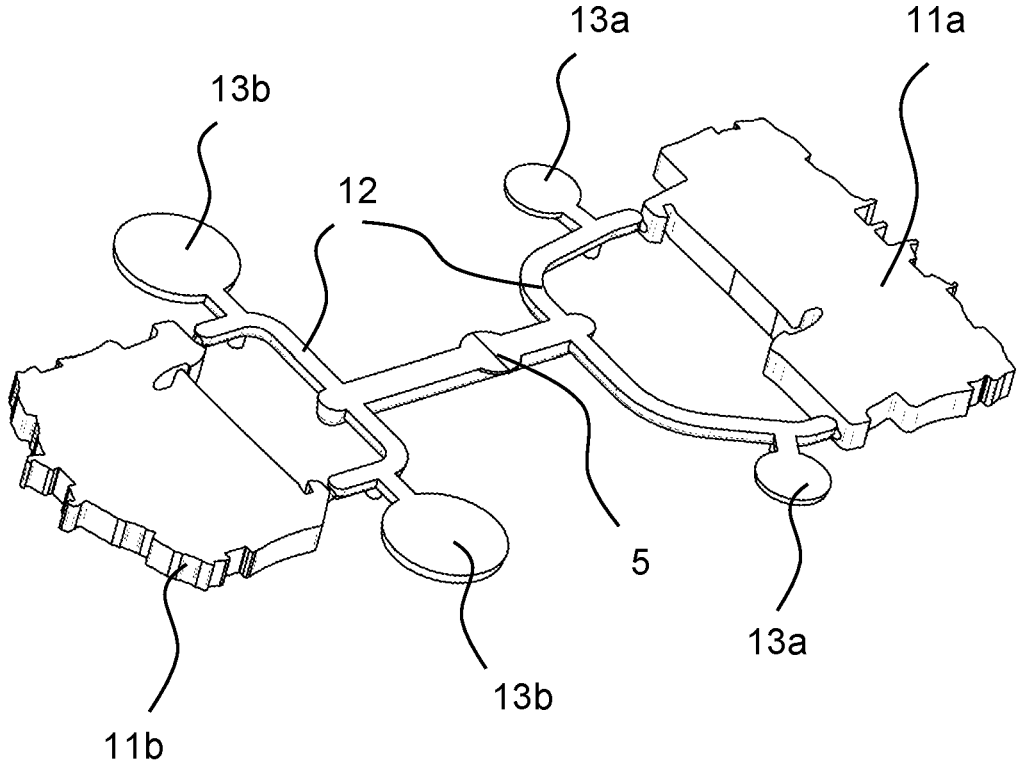
FIG. 2 shows a perspective view of a first group of injection-molded parts with compensation material sections.

FIG. 2 shows a perspective view of injection-molded parts 11*a*, 11*b* which, by use of the injection mold 1 from FIG. 1, have been manufactured by injecting plastic material as injection molding material. It is apparent that webs 12 lead to the injection-molded parts 11*a*, 11*b*, starting from the shared injection site 5. The webs 12 correspond to the shape and the course of the distribution channels 4. The compensation material sections 13*a*, 13*b*, corresponding to the shape and size of the compensation volumes 7*a*, 7*b*, are present adjacent to the opening into the respective injection-molded part 11*a*, 11*b*, i.e., the associated cavity 6*a*, 6*b*.

The volume of the smaller injection-molded part 11*a*, together with the volume of the webs 12 leading to the shared injection point 5 and the compensating material 13*b*, corresponds to the volume of the larger injection-molded part 11*b* together with the webs leading from the shared injection point 5 to this injection-molded part 11*b* and the compensation materials 13*a*.

The volume leading to the two injection-molded parts 11*a*, 11*b* of the two-part group, i.e., the shot weight, is balanced in this way. The so-called shot weight for the right portion of the group, viewed from the injection point 5, is approximately equal to the shot weight of the left portion of the group.

Figure 3:
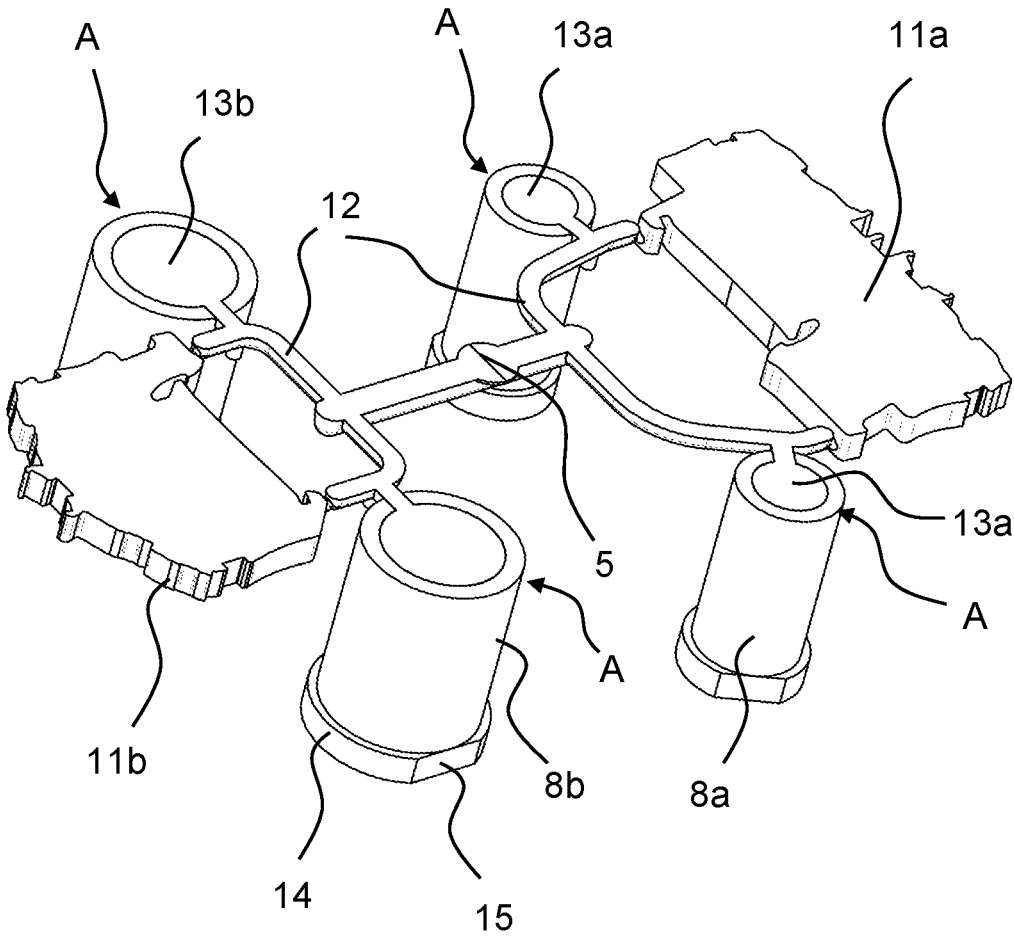
FIG. 3 shows a perspective view from FIG. 2 with compensation inserts.

FIG. 3 shows the illustration of the injection-molded parts 11*a*, 11*b* from FIG. 2, now together with the respective compensation inserts 8*a*, 8*b*. It is apparent that these compensation inserts are cylindrical and have two different diameters. An indentation that is delimited by an edge (collar) and that receives the compensation masses 13*a*, 13*b* is present at the end-face side of the cylindrical compensation inserts 8*a*, 8*b*. The indentation, by its diameter and its depth, determines the desired compensating volume 7*a*, 7*b*, which results in a balanced shot weight for the regions of the group of cavities 6*a*, 6*b* and associated injection-molded parts 11*a*, 11*b* that are connected to a shared injection point 5.

For a communicative connection to the adjoining distribution channel 4, the groove 10 must be aligned with the adjoining distribution channel 4 or the web 12 produced by same. This takes place via a suitable alignment contour in the injection mold 1 or the respective mold 3*a*, 3*b*, and a corresponding contour at the compensation insert 8*a*, 8*b*. In the illustrated example, a radially protruding collar 14 is present at the end opposite from the end face-side compensating volume 7*a*, 7*b*, and has a flat area 15 as an encoding and alignment contour. Thus, only with such an alignment can the compensation insert 8*a*, 8*b* be inserted into a correspondingly encoded, contoured receiving opening 9*a*, 9*b*, which ensures the transition of the groove 10 into the adjoining distribution channel 4.

This alignment contour 15 may be situated, for example, opposite from the groove 10 as shown in the top view.

However, other alignment contours, such as protruding tabs, depressions, and the like that deviate from a symmetrical configuration of the compensation insert 8*a*, 8*b* are also conceivable.

It is also conceivable for the compensation inserts 8*a*, 8*b* to have an overall asymmetrical contour, such as a rectangular contour, which allows insertion into the receiving opening 9*a*, 9*b* in only one or two ways, thus ensuring that the groove 10 is aligned with the distribution channel 4.

Figure 4:
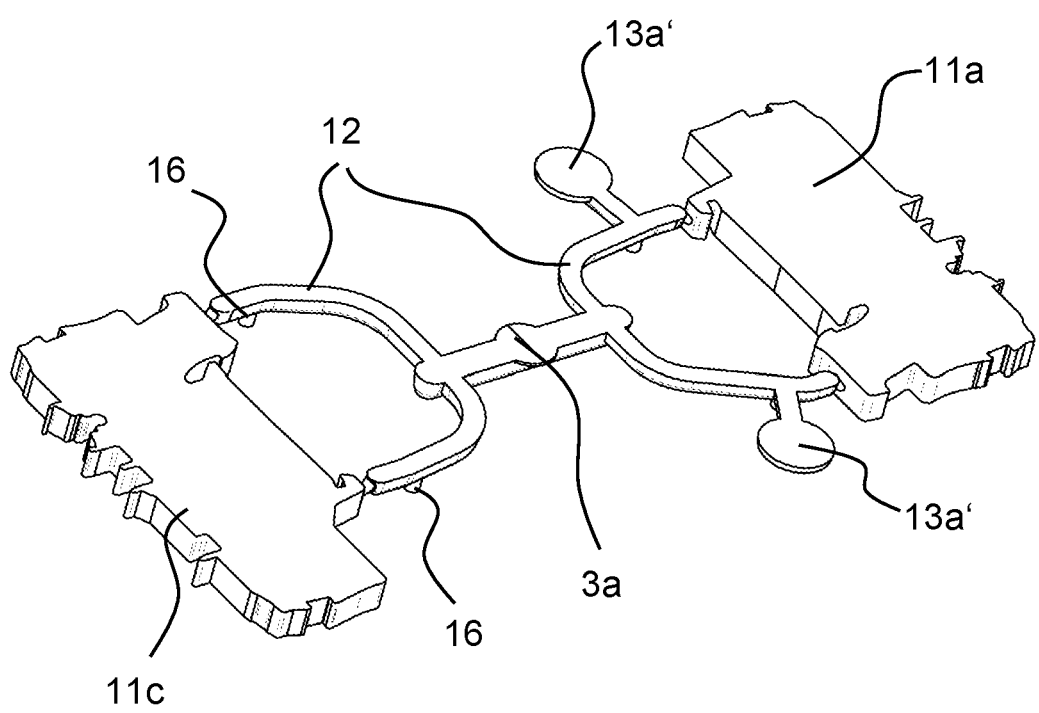
FIG. 4 shows a perspective view of a second group of injection-molded parts with compensation material sections.

FIG. 4 shows another group of injection-molded parts 11*a*, 11*c*. It is clear that the injection-molded part 11*a*, which in the example had the larger volume, now has a smaller volume than the other injection-molded part 11*c*. This is the reason that compensation volumes 7*a* have also been provided with the compensating material 13*a* at the first injection-molded part 11*a*. When limited to the above-described first type of group, this would not be necessary as such, provided that the largest cavity 6*a* of a group determines the shot weight.

However, this cannot be ensured with a variable combination of different cavities 6*a*, 6*b*, 6*c* to form a group.

In the example according to FIG. 4, the injection-molded part 11*c* constitutes the largest part to be manufactured using the injection mold 1, and thus establishes the highest shot weight. For this injection-molded part 11*c* and the associated cavity 6*c*, no receiving opening 9*a*, 9*b* for insertion of a compensation insert 8*a*, 8*b* is then necessary.

However, in the mold 3*a*, 3*b*, for such a cavity 6*c* a compensation opening 9*a*, 9*b* adjoining the distribution channel 4 may still be provided as a precaution. This compensation opening 9*a*, 9*b* may then be fitted with a compensation insert 8*a*, 8*b* which has a closed end-face side and thus, a compensating volume of zero. For the case that a combination of a group still takes place in which one cavity 6*a*, 6*b* is larger, the required compensating volume may still be set.

In the example, small downwardly protruding tabs 16 at the webs 12 are discernible. These tabs are also present at the other sections of the webs 12, and do not represent a compensating volume 7*a*, 7*b* within the meaning of the present invention. Their volume is much too small to result in effective balancing of the shot weight. Rather, such tabs are present, via intentional indentation, for position fixing during cooling and ejection, or result from guide openings for plungers of an ejection tool on the ejection side of the mold.

Figure 5:
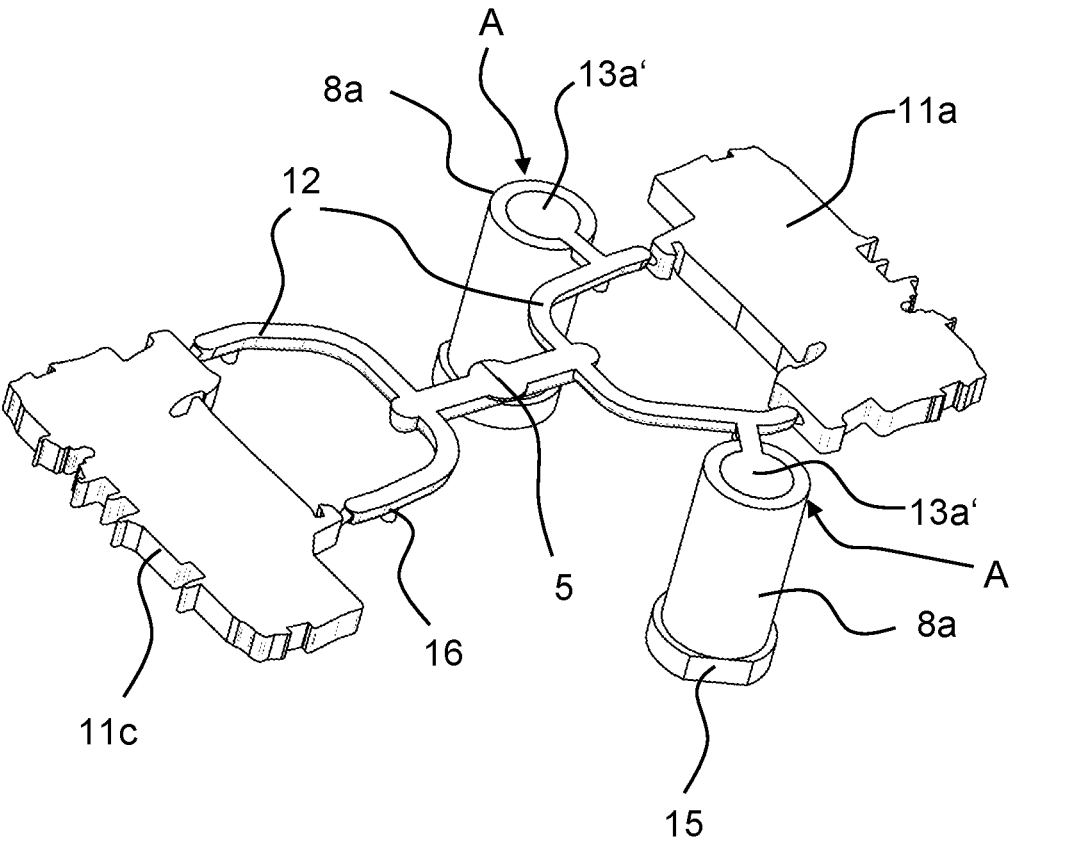
FIG. 5 shows a perspective view from FIG. 4 with compensation inserts.

FIG. 5 shows the example from FIG. 4 in a perspective view, together with the compensation inserts 8*a* and the compensation masses 13*a* accommodated in the end-face end.

Figure 6:
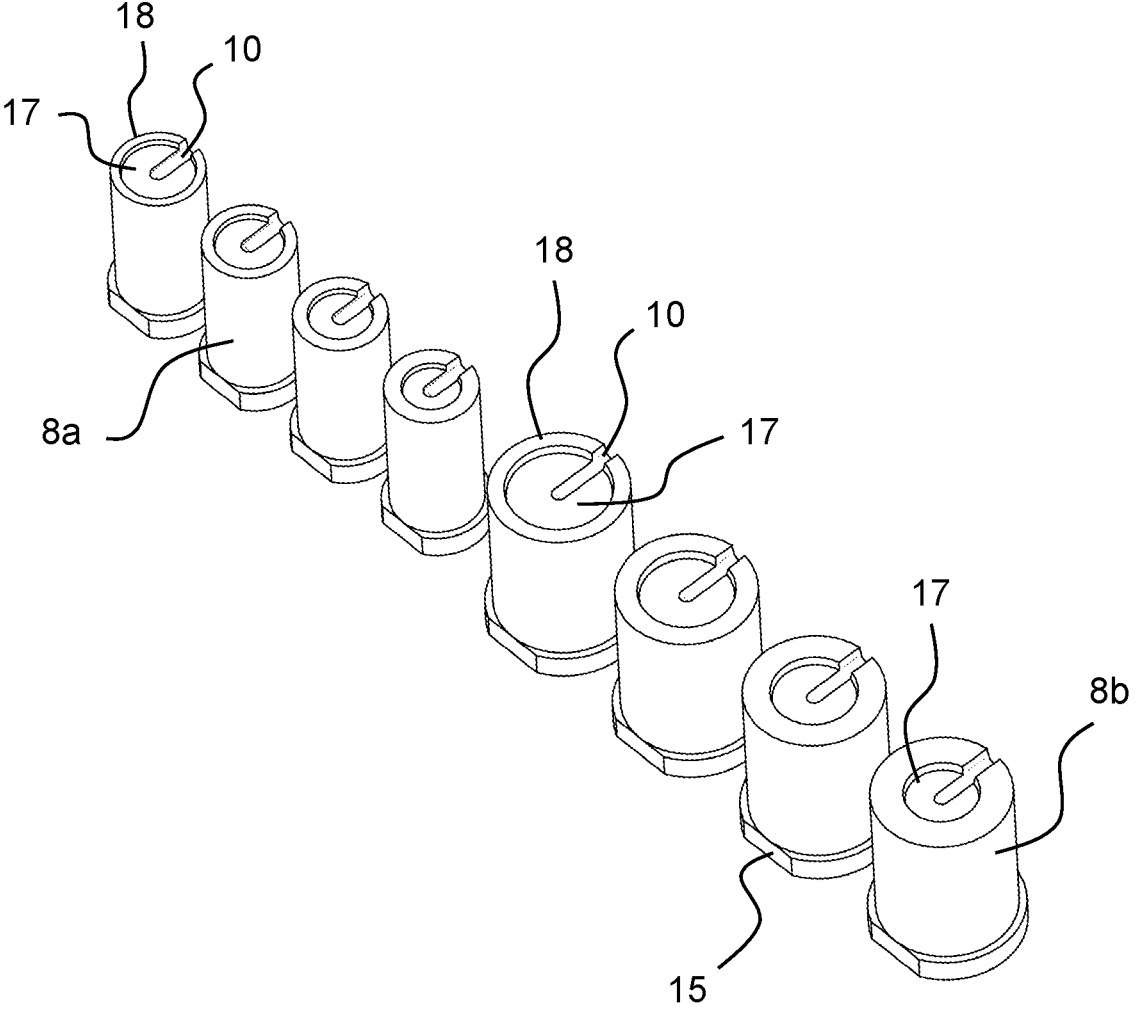
FIG. 6 shows a diagram of a set of compensation inserts.

FIG. 6 shows a set of compensation inserts 8*a*, 8*b*. The set is made up of two different types of cylindrical compensation inserts 8*a*, 8*b* having different diameters.

Each of these compensation inserts 8*a*, 8*b* at its end-face side has a compensation cavity 17 with a different diameter. The depths of the compensation cavities 17 may also be different for the compensation inserts 8*a*, 8*b* of a set. Different compensation volumes 7*a*, 7*b* are thus provided. By selecting a suitable compensation insert 8*a*, 8*b* having the compensating volume 7*a*, 7*b* necessary for balancing the shot weight, the mold inserts 3*a*, 3*b* for the combination of a group of mold inserts 3*a*, 3*b*, and thus a group of cavities 6*a*, 6*b*, may be coordinated with one another so that the shot weights of the cavities 6*a*, 6*b*, formed by a shared distribution channel 4 at a shared injection site 5, each accommodate the same injection molding volume.

It is also apparent that the compensation cavities 17 at the end-face sides of the compensation inserts 8a, 8b are delimited by a circumferential edge 18 that is interrupted by a radial outwardly leading groove 10.

The depth of the groove 10 may be greater than the depth of the compensation cavity 17. The flow behavior may be influenced by the design of the groove 10.

FIGS. 7A and 7B show a top view of the first group illustrated in FIGS. 1 through 3, and of the second group illustrated in FIGS. 4 and 5, of injection-molded parts 11a, 11b, 11c.

In a comparison of FIGS. 7A and 7B, it is apparent that for the same injection-molded part 11a in the left group (FIG. 7A), a smaller compensating volume 7a has been selected than for the other make-up of the group in combination with the larger injection-molded part 11c (FIG. 7B).

Thus, it is not necessary for a single shot weight, i.e., a single injection volume per mold 3a, 3b, to be determining, regardless of the make-up of the group. Rather, an effort is made for the shot weight for the particular combined group, starting from the shared injection point 5, to be the same. As illustrated for the make-up of the group according to FIG. 7B, this may result in a higher shot weight per injection-molded part 11a, 11b and volumes connected thereto, than for the group illustrated in FIG. 7A.

Figures 8A, 8B:
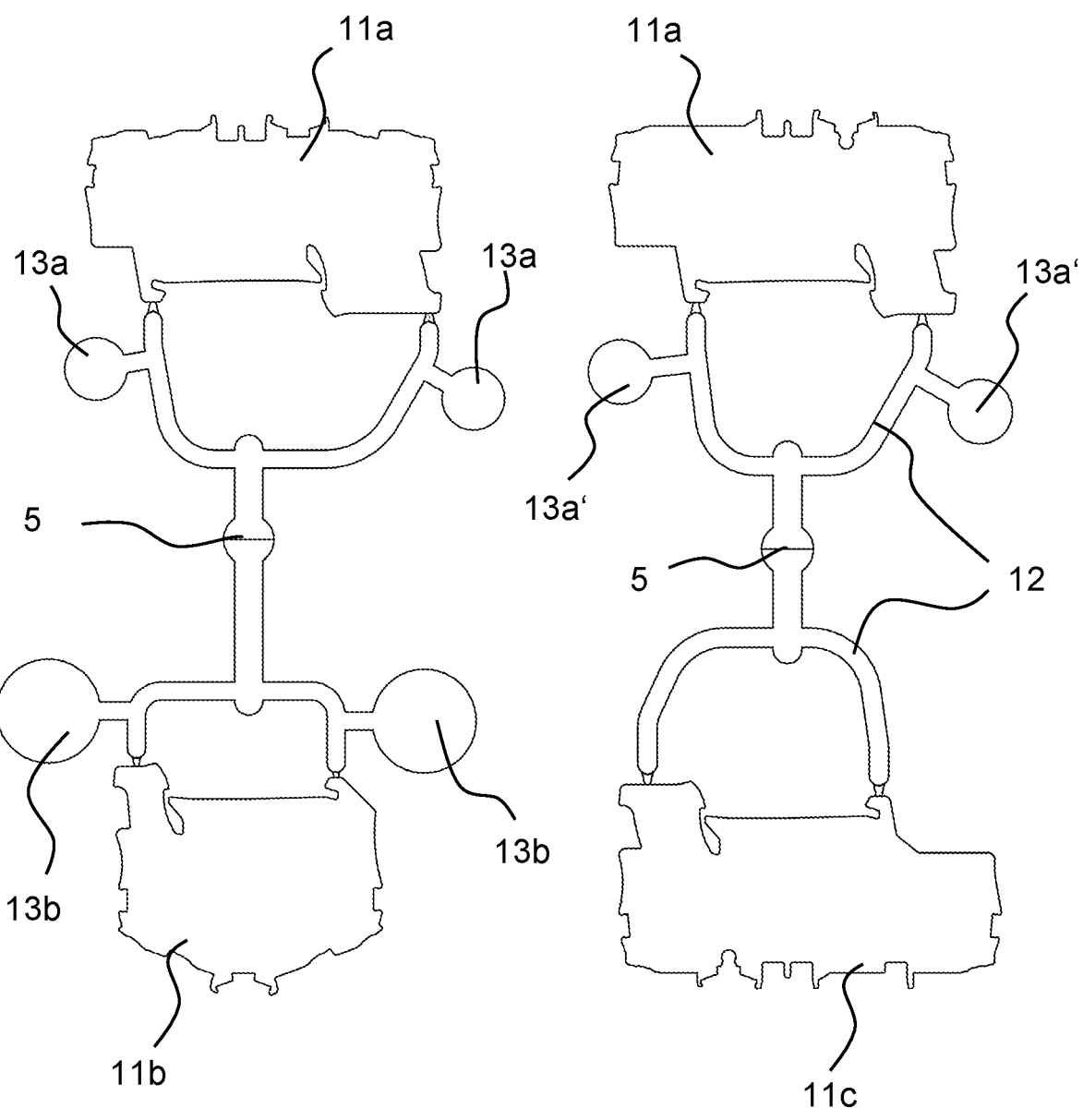
FIGS. 8A and 8B show a top view of the first and second group of injection-molded parts with compensation material sections.

FIGS. 8A and 8B once again show a top view of the injection-molded parts 11a, 11b, 11c, manufactured after injection of the injection molding material, together with the webs 12 integrally formed thereon and compensation masses 13a, 13a', 13b after removal from the injection mold 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An injection mold for manufacturing injection-molded parts by injecting injection molding material into cavities each having a contour substantially corresponding to a respective one of the injection-molded parts to be manufactured, the injection mold comprising:

a distribution channel for injection molding material which is connectable to an injection nozzle and is in communicative connection with each of the cavities;

a compensating volume region provided for the distribution channel, the compensating volume region having a compensating volume determined by a type and number of the cavities connected to the distribution channel to accommodate injection molding material during the injection molding process, wherein the compensating volume region is branched off of a section of the distribution channel, such that as the injection molding material flows through the section of the distribution channel, a portion of the injection molding material flows into the compensating volume region and is maintained in the compensating volume region, while a remaining portion of the injection molding material continues to flow through the section of the distribution channel.

2. The injection mold according to claim 1, wherein the compensating volume region has a receiving opening, wherein different compensation inserts are provided, which are each selectively insertable into the receiving opening, each of the compensation inserts having an indentation which communicates with the distribution channel to provide the compensating volume, and wherein the indentations of the different compensation inserts have different volumes, such that the compensating volume is modifiable based on a selection of one of the compensation inserts to be inserted into the receiving opening.

3. The injection mold according to claim 2, wherein each of the compensation inserts have an end-face side provided with the indentation, the end-face side having a radially outwardly leading groove merging into the indentation, and the distribution channel being communicatively connectable to the indentation via the groove when a respective one of the compensation inserts is inserted into the receiving opening of the injection mold.

4. The injection mold according to claim 3, wherein each of the compensation inserts has a single opening for flow of the injection molding material, wherein the groove forms the single opening.

5. The injection mold according to claim 2, wherein the compensation inserts are cylindrical.

6. The injection mold according to claim 2, wherein the indentations of the compensation inserts have different diameters.

7. The injection mold according to claim 2, wherein the compensation inserts have at least two different outer diameters, and wherein the injection mold includes at least two compensating volume regions, and wherein the receiving opening of each of the at least two compensating volume regions has a diameter that is determined by the cavities to accommodate a respective one of the compensation inserts to provide the compensating volume.

8. The injection mold according to claim 1, wherein two or more of the cavities are provided and are connected to the distribution channel, and the distribution channel is in communicative connection with the compensating volume, and wherein a position of the compensating volume with respect to one of the cavities, and a size of the compensating volume being determined by a combination of the cavities.

9. The injection mold according to claim 1, wherein the compensating volume region, as a branch, is connected to the distribution channel in a region of a transition of the distribution channel into an associated one of the cavities.

10. The injection mold according to claim 1, wherein for at least one cavity of the cavities connected to the distribution channel, the compensating volume is connected to the distribution channel adjacent to a transition of the distribution channel into the at least one cavity.

11. The injection mold according to claim 1, wherein the injection mold has an injection molding material distribution unit with a nozzle-side mounting frame and an ejection-side mounting frame, the nozzle-side mounting frame and/or the ejection-side mounting frame being designed for accommodating mold inserts having the cavities, and the distribution channel with the compensating volume region being introduced into the mold inserts or into the nozzle-side mounting frame and/or the ejection-side mounting frame.

12. The injection mold according to claim 1, wherein the distribution channel directs the injection molding material to all of the cavities provided in the injection mold.

13. A method for manufacturing injection-molded parts using the injection mold according to claim 1, the method comprising:

introducing the compensating volume region into the injection mold, the compensating volume region being in communicative connection with the distribution channel and for accommodating injection molding material, the compensating volume region having the compensation volume that is adapted to the type and number of the cavities connected to the distribution channel, wherein the compensating volume region is introduced into the injection mold so as to be branched off of the section of the distribution channel, such that as the injection molding material flows through the section of the distribution channel, the portion of the injection molding material flows into the compensating volume region and is maintained in the compensating volume region, while the remaining portion of the injection molding material continues to flow through the section of the distribution channel.

14. The method according to claim 13, further comprising:

selecting compensation inserts from a set of different compensation inserts that provide various compensation volumes such that a position and size of the compensation volume is adapted to the type and number of the cavities connected to the distribution channel; and inserting the selected compensation inserts into respective associated receiving openings in the compensating volume region of the injection mold.

* * * * *